US009587645B2

United States Patent
Guglielmin et al.

(10) Patent No.: US 9,587,645 B2
(45) Date of Patent: *Mar. 7, 2017

(54) AIRFOIL BLADE

(75) Inventors: George Guglielmin, Toronto (CA); Joe Lanzino, Orangeville (CA); Enzo Macchia, Kleinburg (CA); Barry Barnett, Markham (CA); Andreas Eleftheriou, Woodbridge (CA); Thomas McDonough, Barrie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 601 days.

This patent is subject to a terminal disclaimer.

(21) Appl. No.: 13/189,118

(22) Filed: Jul. 22, 2011

(65) Prior Publication Data
US 2012/0082559 A1    Apr. 5, 2012

Related U.S. Application Data

(60) Provisional application No. 61/388,397, filed on Sep. 30, 2010.

(51) Int. Cl.
*F01D 5/14* (2006.01)
*F04D 29/38* (2006.01)
(Continued)

(52) U.S. Cl.
CPC ............ *F04D 29/388* (2013.01); *B82Y 30/00* (2013.01); *C23C 4/01* (2016.01); *C23C 30/00* (2013.01); *F01D 5/147* (2013.01); *F01D 5/282* (2013.01); *F01D 5/288* (2013.01); *F01D 9/041* (2013.01); *F01D 25/162* (2013.01);
(Continued)

(58) Field of Classification Search
CPC .......... F01D 5/288; F01D 9/041; F01D 9/162; F04D 29/388; F04D 29/325; C23C 4/01; C23C 30/00
USPC ............ 416/224, 229 A, 229 R, 230, 241 R; 29/889.21, 889.7
See application file for complete search history.

(56) References Cited

U.S. PATENT DOCUMENTS 2,581,252 A * 1/1952 Goetzel et al. ............... 428/553
3,291,382 A   12/1966 Vaughau et al.
(Continued)

FOREIGN PATENT DOCUMENTS

EP      229519       11/1996
JP      1-200003 A *  8/1989
(Continued)

OTHER PUBLICATIONS

Izumi, Method of adhering anticorrosion piece in turbine blade, Aug. 11, 1989, Abstract of JP 1-200003A.*
(Continued)

*Primary Examiner* — Eric Keasel
*Assistant Examiner* — Maxime Adjagbe
(74) *Attorney, Agent, or Firm* — Norton Rose Fulbright Canada LLP

(57) ABSTRACT

A fan blade of a gas turbine engine, and a method of producing same, is disclosed which is composed of a core substrate and a nanocrystalline metal coating provided on at least a portion of the airfoil of the fan blade. The method includes the steps of providing a fan blade core having an airfoil and then applying a nanocrystalline metal coating over at least a portion of the fan blade core.

8 Claims, 4 Drawing Sheets

(51) Int. Cl.
  *B82Y 30/00* (2011.01)
  *C23C 30/00* (2006.01)
  *F01D 5/28* (2006.01)
  *F01D 9/04* (2006.01)
  *F01D 25/16* (2006.01)
  *F04D 29/02* (2006.01)
  *F04D 29/32* (2006.01)

(52) U.S. Cl.
  CPC ......... *F04D 29/023* (2013.01); *F04D 29/325* (2013.01); *B22F 2998/00* (2013.01); *Y02T 50/672* (2013.01); *Y02T 50/673* (2013.01); *Y10T 29/49336* (2015.01)

(56) References Cited

U.S. PATENT DOCUMENTS

| | | | |
|---|---|---|---|
| 3,892,612 A * | 7/1975 | Carlson et al. | 156/150 |
| 4,023,249 A | 5/1977 | Darrow et al. | |
| 4,063,847 A | 12/1977 | Simmons | |
| 4,377,370 A | 3/1983 | Porcelli | |
| 4,619,699 A | 10/1986 | Petkovic-Luton et al. | |
| 4,655,682 A | 4/1987 | Kunz et al. | |
| 4,921,405 A | 5/1990 | Wilson | |
| 4,957,415 A | 9/1990 | Paul et al. | |
| 5,149,251 A | 9/1992 | Scanlon et al. | |
| 5,252,160 A | 10/1993 | Scanlon et al. | |
| 5,314,304 A | 5/1994 | Wiebe | |
| 5,358,029 A * | 10/1994 | Baveja et al. | 164/516 |
| 5,449,273 A | 9/1995 | Hertel et al. | |
| 5,486,096 A | 1/1996 | Hertel et al. | |
| 5,601,933 A | 2/1997 | Hajmrle et al. | |
| 5,635,654 A | 6/1997 | Hebsur et al. | |
| 5,881,972 A | 3/1999 | Smith et al. | |
| 6,110,604 A | 8/2000 | Rickerby | |
| 6,341,747 B1 | 1/2002 | Schmidt et al. | |
| 6,358,014 B1 | 3/2002 | Chou et al. | |
| 6,482,532 B1 | 11/2002 | Yap et al. | |
| 6,482,537 B1 | 11/2002 | Strangman et al. | |
| 6,617,049 B2 | 9/2003 | Darolia et al. | |
| 6,620,525 B1 | 9/2003 | Rigney et al. | |
| 6,723,387 B1 | 4/2004 | Kear et al. | |
| 6,729,846 B1 | 5/2004 | Wobben | |
| 6,773,817 B1 * | 8/2004 | Sagel | C22C 45/001 416/241 R |
| 6,875,529 B1 | 4/2005 | Spitsberg et al. | |
| 6,887,589 B2 | 5/2005 | Pfaendtner et al. | |
| 6,973,792 B2 | 12/2005 | Hicks | |
| 7,080,973 B2 | 7/2006 | Tung et al. | |
| 7,108,485 B2 | 9/2006 | Wobben | |
| 7,186,092 B2 | 3/2007 | Bruce et al. | |
| 7,247,348 B2 | 7/2007 | Power | |
| 7,300,708 B2 | 11/2007 | Gigliotti, Jr. et al. | |
| 7,311,981 B2 | 12/2007 | Saint Ramond et al. | |
| 7,320,832 B2 | 1/2008 | Palumbo et al. | |
| 7,344,675 B2 | 3/2008 | Van Daam et al. | |
| 7,354,354 B2 | 4/2008 | Palumbo et al. | |
| 7,354,490 B2 | 4/2008 | Fritzemeier et al. | |
| 7,361,386 B2 | 4/2008 | Kim et al. | |
| 7,364,806 B2 | 4/2008 | Matsumoto et al. | |
| 7,387,578 B2 | 6/2008 | Palumbo et al. | |
| 7,387,587 B2 | 6/2008 | Dean | |
| 7,431,566 B2 | 10/2008 | Gray et al. | |
| 7,517,930 B2 | 4/2009 | Eschborn et al. | |
| 7,640,661 B2 | 1/2010 | Despreaux et al. | |
| 7,662,207 B2 | 2/2010 | Miura et al. | |
| 7,740,960 B1 | 6/2010 | Zhu et al. | |
| 7,753,653 B2 | 7/2010 | Cairo et al. | |
| 7,758,306 B2 | 7/2010 | Burton et al. | |
| 7,766,623 B2 | 8/2010 | Chou et al. | |
| 7,775,772 B2 | 8/2010 | Carrier et al. | |
| 7,784,182 B2 | 8/2010 | Carrier et al. | |
| 7,824,507 B2 | 11/2010 | Van Daam et al. | |
| 7,914,256 B2 | 3/2011 | Xie et al. | |
| 7,942,638 B2 | 5/2011 | Eichmann et al. | |
| 8,545,994 B2 * | 10/2013 | Facchini et al. | 428/687 |
| 2002/0045053 A1 | 4/2002 | Hoskin | |
| 2003/0138301 A1 | 7/2003 | Kuerzel | |
| 2004/0172827 A1 | 9/2004 | Kinstler et al. | |
| 2004/0219010 A1 | 11/2004 | Merrill et al. | |
| 2005/0133121 A1 | 6/2005 | Subramanian et al. | |
| 2005/0135928 A1 | 6/2005 | Servadio et al. | |
| 2005/0205425 A1 | 9/2005 | Palumbo et al. | |
| 2005/0255329 A1 | 11/2005 | Hazel | |
| 2005/0260078 A1 | 11/2005 | Potter et al. | |
| 2005/0278950 A1 * | 12/2005 | Despreaux et al. | 29/889.71 |
| 2006/0147688 A1 | 7/2006 | Subramanian et al. | |
| 2006/0193742 A1 | 8/2006 | Miura et al. | |
| 2007/0087185 A1 | 4/2007 | Wei et al. | |
| 2007/0099027 A1 | 5/2007 | Krishnamurthy et al. | |
| 2007/0140853 A1 | 6/2007 | McCann et al. | |
| 2007/0141370 A1 | 6/2007 | Kerber | |
| 2007/0163114 A1 | 7/2007 | Johnson | |
| 2007/0190245 A1 * | 8/2007 | Gupta et al. | 427/237 |
| 2008/0145649 A1 | 6/2008 | Mannem et al. | |
| 2008/0170943 A1 * | 7/2008 | Cairo et al. | 416/224 |
| 2008/0216383 A1 | 9/2008 | Pierick et al. | |
| 2008/0298976 A1 | 12/2008 | Kriegl | |
| 2009/0016894 A1 | 1/2009 | Strother | |
| 2009/0028697 A1 | 1/2009 | Shi et al. | |
| 2009/0055339 A1 | 2/2009 | Bernard | |
| 2009/0081032 A1 | 3/2009 | Moroso et al. | |
| 2009/0120101 A1 | 5/2009 | Lomasney et al. | |
| 2009/0229984 A1 | 9/2009 | Schuh et al. | |
| 2010/0055339 A1 | 3/2010 | Shinde et al. | |
| 2010/0226782 A1 | 9/2010 | Eichmann et al. | |
| 2010/0304063 A1 | 12/2010 | McCrea et al. | |
| 2010/0304065 A1 | 12/2010 | Tomantschger et al. | |
| 2010/0304171 A1 * | 12/2010 | Tomantschger et al. | 428/548 |
| 2010/0304172 A1 | 12/2010 | Facchini et al. | |
| 2010/0304179 A1 | 12/2010 | Facchini et al. | |
| 2010/0304181 A1 | 12/2010 | Anand et al. | |
| 2011/0020548 A1 | 1/2011 | Eichmann et al. | |
| 2011/0176927 A1 | 7/2011 | Alexander et al. | |
| 2011/0211967 A1 * | 9/2011 | Deal | F01D 5/147 416/224 |
| 2011/0287223 A1 | 11/2011 | Victor et al. | |
| 2012/0051935 A1 | 3/2012 | Naik et al. | |
| 2012/0082553 A1 | 4/2012 | Eleftheriou | |
| 2012/0082556 A1 * | 4/2012 | Macchia et al. | 416/241 A |
| 2012/0175534 A1 | 7/2012 | Jung et al. | |

FOREIGN PATENT DOCUMENTS

| | | | |
|---|---|---|---|
| JP | 6-159003 A * | 6/1994 | |
| WO | 2009006871 | 1/2009 | |
| WO | 2009006871 A2 | 1/2009 | |

OTHER PUBLICATIONS

Aoki, Gas Turbine Blade, Jun. 7, 1994, Abstract of JP 6-159003A.*
Tjong, Nanocrystalline materials and coatings, Aug. 10, 2004.*
Lima, Microstructural characteristics of cold-sprayed nanostructured WC-Co coatings, Jul. 2002, Thin Solid Films 416, 129-135.*
Integran Technologies Inc.: http://www.integran.com/pages/nano_ns.html.
www.repliforminc.com/products.htm#RePliKote, Copyright 2006.
Izumi, Method of Adhering Anticorrosion piece in turbine blade, Aug. 11, 1989, PAJ, Abstract of JP1-200003A.
Aoki, Gas Turbine Blade, Jun. 7, 1994, PAJ, Abstract of JP6-159003A.
Integran Technologies Inc: http://www.integran.com/pages/nano_ns.html.

* cited by examiner

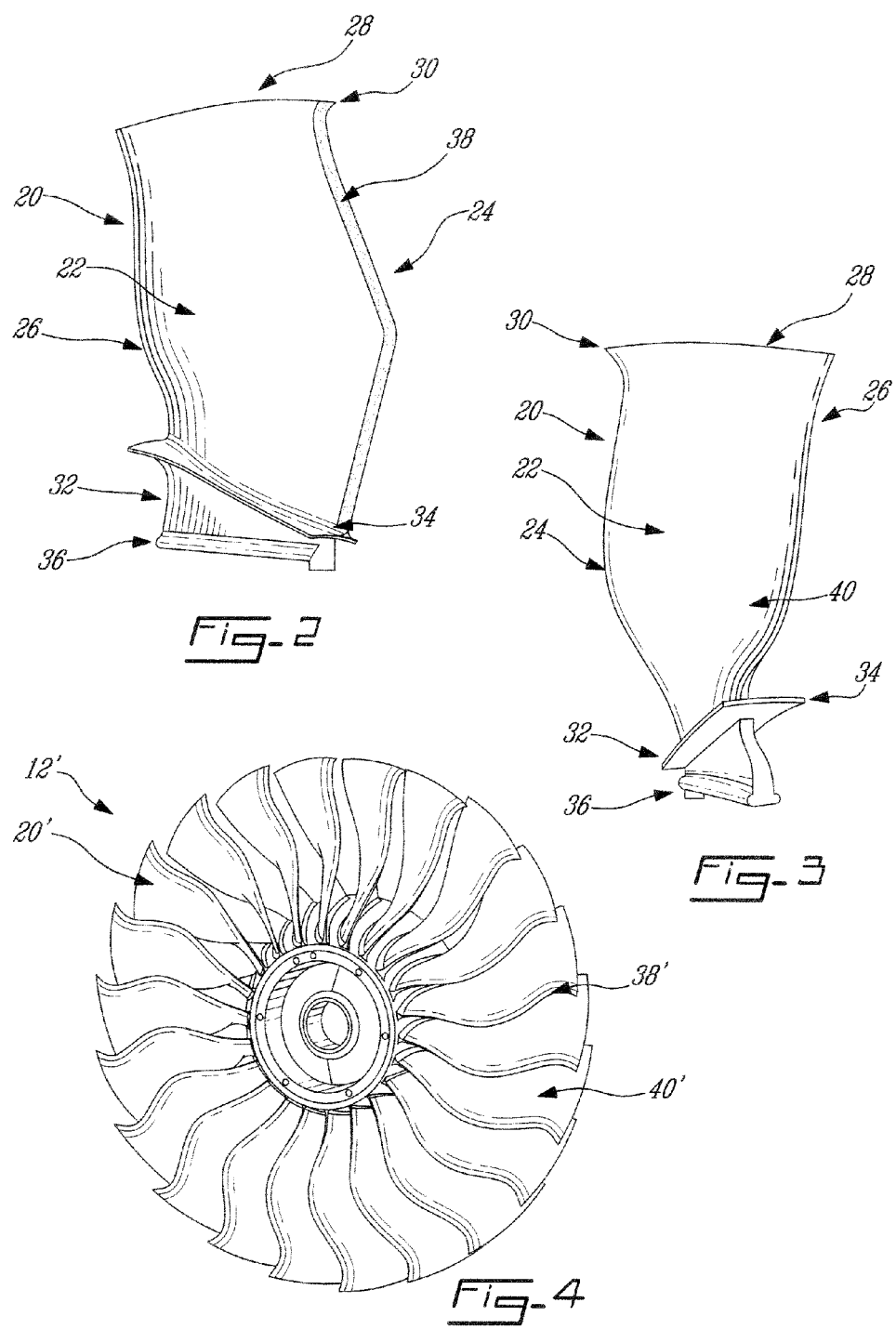

AIRFOIL BLADE

CROSS-REFERENCE TO RELATED APPLICATIONS

The present application claims priority on U.S. Provisional Patent Application No. 61/388,397 filed Sep. 30, 2010, the entire contents of which is incorporated herein by reference.

TECHNICAL FIELD

The application relates generally to gas turbine engines, and more particularly to airfoil blades for gas turbine engines, such as turbofan blades for example.

BACKGROUND

Gas turbine engine blades, and particularly fan blades of turbofan engines, experience foreign object damage (FOD) and erosion, as well as corrosion in some instances. Methods exist that can be used to improve FOD resistance, for example by increasing blade leading edge thickness, and to improve erosion resistance, for example by physical vapour deposition (PVD) coating or by chemical vapour deposition (CVD) coating, or a bonded metal sheath. However, each of the known processes has its disadvantages and limitations due to fatigue debits, reduced airfoil aerodynamic efficiency, manufacturing capabilities and durability. Field blending and leading edge (LE) restoration of the fan blade is also often required, as LE wear tends to degrade aerodynamic performance.

In addition, conventional titanium alloy aero-turbine engine fan blades have high density and cost relative to aluminium alloys and carbon fiber reinforced polymer composites. Fan blades made from high density materials such as titanium alloys significantly increase the weight of the fan hub needed to support the centrifugal force of the rotating fan blades. Such high density fan blades also significantly increases the weight of the containment fan casing required and support structures needed to contain the high kinetic energy of a released fan blade in the event of blade failure that releases the whole fan blade from its root fixing. Carbon fiber reinforced polymer composite fan blades, on the other hand, require a thick blade leading, edge (relative to a solid titanium airfoil) as well as a metal leading edge sheath for protection from FOD and for erosion resistance. However such thick blade leading edges cause significant reduction in blade aerodynamic efficiency and thus a significant overall reduction in engine efficiency.

Therefore, there is a need for an aircraft engine fan blade which provides improved aerodynamic efficiency and durability, without compromising ease of maintenance and while being lightweight and thus helping with overall engine weight reduction and providing a cost saving.

SUMMARY

In accordance with one aspect of the present application, there is provided a fan blade of a gas turbine engine comprising an airfoil having a leading edge and a trailing edge, the airfoil extending from a root to a tip, the fan blade being composed of a core substrate, and at least a portion of the airfoil of the fan blade having a nanocrystalline metal coating thereon which forms an outer surface of said portion of the airfoil.

In accordance with another aspect of the present application, there is provided a method of manufacturing a fan blade for a gas turbine engine comprising the steps of: providing a fan blade core having an airfoil having a leading edge and a trailing edge, the airfoil extending from a root to a tip; and then applying a nanocrystalline metal coating over at least a portion of the fan blade core.

There is further provided, in accordance with another aspect, a method of manufacturing a fan blade for a gas turbine engine comprising the steps of: forming a fan blade core having an airfoil with a leading edge and a trailing edge; and applying a nanocrystalline metal coating on the airfoil of the fan blade core, including varying a thickness of the nanocrystalline metal coating such as to one or more regions of reduced coating thickness and one or more regions of increased coating thickness, the location on said airfoil of said regions of reduced and increased coating thickness being selected to at least one of reduce stresses in the fan blade, increase stiffness of the fan blade to reduce deflections thereof, and dynamically tune the fan blade.

There is further provided, in accordance with another aspect, a method of improving structural and/or impact strength of a gas turbine engine fan blade comprising applying a nanocrystalline metal coating over at least a portion of an airfoil of the fan blade, said portion including, at least a leading edge of the airfoil.

DESCRIPTION OF THE DRAWINGS

Reference is now made to the accompanying figures in which:

FIG. 2 is an isometric side view of a fan blade of the engine of FIG. 1;

FIG. 3 is an isometric rear view of another example of a fan blade of the engine of FIG. 1;

FIG. 4 is an isometric view of an integrally bladed rotor suitable for the engine of FIG. 1;

DETAILED DESCRIPTION

Figure 1:
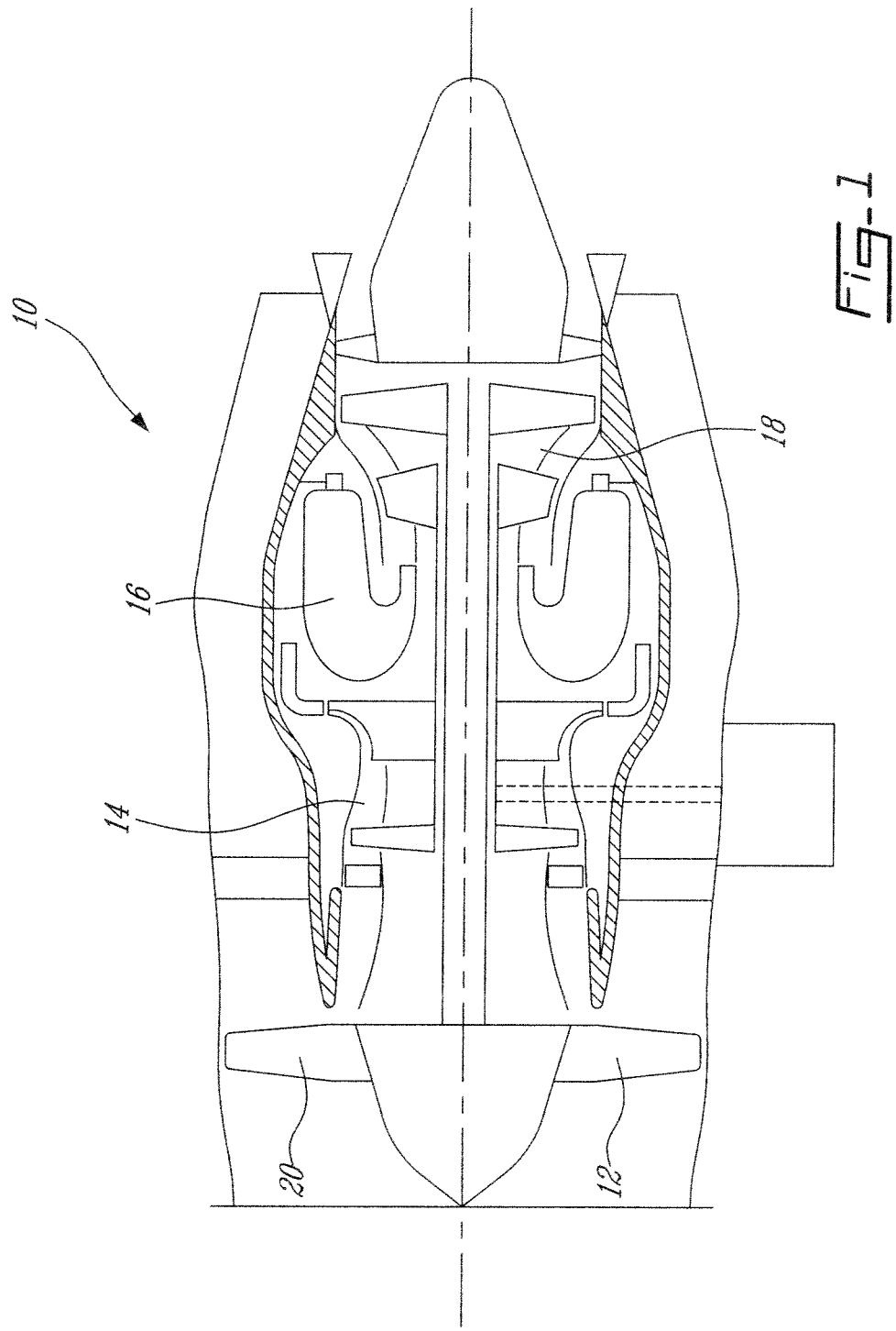
FIG. 1 is a schematic cross-sectional view of a turbofan gas turbine engine.

FIG. 1 illustrates a gas turbine engine 10, and more particularly a turbofan engine, generally comprising, in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 21 comprises a plurality of blades 20, as will be described in further detail below.

Referring to FIG. 2, a fan blade 20 of the fan 12, is shown. The fan blade has an airfoil 22 with a leading edge 24, trailing edge 26, tip 28 and beak 30, as well as a root 32 having a platform 34 and a blade fixing or dovetail 36 for engaging a fan hub (not shown). In this example, the fan blade 20 is composed of a high strength aluminum alloy such as, but not limited to, 7000 series aluminium alloy (though alternately another suitable material may be used, such as titanium alloy or fibre reinforced composite, for example), and has nanocrystalline metal coating ("nano coating") applied to at least a portion of the fan blade, such as a leading edge region 38 of the blade leading edge 24. Alternately, the nanocrystalline metal coating may cover the entire blade surface, including the airfoil, platform and dovetail portions, depending on the base substrate material from which the blade is made. The application of the nano coating may improve foreign object damage (FOD) resistance, wear resistance, and aerodynamic performance. Aerodynamic performance gains are achieved through use of a thinner leading edge and the ability to use more complex 3D shapes not limited by other manufacturing methods previously employed to make and/or apply metal sheaths to leading edges.

The airfoil portion 22 of the fan blade 20 is therefore formed of a bi-material structure, comprising a core made of a first material and a leading edge sheath or coating composed of the nanocrystalline metal. The core or body of the airfoil may be a metal, such as the high strength aluminum alloy mentioned above, or may alternately comprise a composite substrate material such as a carbon fiber composite for example. Regardless, the nanocrystalline metallic outer coating covers at least the full length of the leading edge region 38 of the fan blade. Accordingly, a "hybrid" fan blade airfoil is thus provided. In the depicted embodiment, the nanocrystalline metal coating is disposed on the airfoil 22 along the leading edge (LE) 38 thereof, which in fact covers a leading edge region comprising the LE itself and which extends away therefrom in the direction of airflow along the pressure and suction sides of the airfoil 22. The nanocrystalline metal coating may extend away from the LE a desired distance, within this coating region. This desired distance may vary from only several millimeters or greater as required. For example, this LE distance may form a small band covering the LE and the very forward surfaces of the pressure and suction sides of the airfoil, but may alternately be extended further along the pressure and/or suction sides of the airfoil, including such that the nanocrystalline metal coating covers the full width of the fan airfoil 22, as needed. The region of the airfoil 22 having the nanocrystalline metal coating may thus extend, on both the pressure and suction side of the fan blade, from the LE up to a more significant proportion of the airfoil width than simply covering the leading edge 38 thereof as shown in FIG. 2.

The nano coating may be applied by a plating process, such as described further below, and thereby may also result in a molecular bond that improves fatigue endurance to the fan blade 20. The grit blast preparation required with many other fan blade protective treatments can be eliminated, as this is not required prior to the application of the present nanocrystalline metal coating to the fan airfoil. Nanocrystalline materials may increase the material strength, yield and toughness compared to base microcrystalline metal substrate, which may also result in less base metal substrate material being required to meet equivalent strength requirements. Shot peening of fan airfoils is typically used on metallic fan surfaces to improve fatigue endurance. The presently described nano-coated fan airfoil 22 or fan blade 20 improves fatigue endurance and hence does not require shot peening. The coating thickness may be varied to, for example, blend the coated regions with the uncoated regions, to provide a smooth airfoil exterior surface without the need for "notching" of the blade base material, as is required for example with fan blades that have traditional metal sheaths on their leading edge. Doing so allows for lower internal stresses and improves fatigue life of the blade. Alternately, the nanocrystalline metal coating may be deposited over the entire fan blade 20 to improve corrosion resistance, to improve erosion resistance, to prevent fretting and wear of blade root fixing, to prevent blade tip wear from rubbing, and/or to improve thermal expansion match with the fan casing for improved blade tip clearance and thus improved engine performance. In addition, the nano coating thickness may vary at different areas on the blade in order to minimize blade weight, e.g. thicker coating at high blade stress areas to reduce blade substrate stresses and thus to improve fatigue life, and thicker at leading edge to improve FOD resistance, etc. The nano coating is thus strategically applied to specific locations of the airfoil such as to tune the vibrational modes of vibration of the airfoil and thereby reduce flutter.

The nano coating is a nanocrystalline metal deposit that is, in at least one embodiment, applied directly to the substrate of the fan blade 20. In another example, described in more detail in U.S. Pat. No. 7,591,745 which is incorporated herein by reference, the process involves employing a layer of conductive material between the substrate and the nano coating layer to improve adhesion to the blade substrate when required, e.g. polymer substrate. In this alternate embodiment, an intermediate bond coat is first disposed on the metal substrate of the vane airfoil before the nanocrystalline metallic coating is applied along at least the LE 38 of the blade airfoil 22. This intermediate bond coat may improve adhesion between the nanocrystalline metal coating and the substrate of the blade, and therefore improve the coating process, the bond strength and/or the structural performance of the nanocrystalline metal coating that is bonded to the substrate of the blade airfoil.

The nano coating forms an outer layer which acts structurally to stiffen and strengthen the substrate material. Due to its nanocrystalline grain size, the nano coating provides for improved structural properties and structural performance as well as fatigue endurance of the fan blade. The coating metal grain size may range between about 1 nm and 5000 nm. The nano coating may be a nickel (Ni), cobalt (Co), or another suitable metal or metal alloy, such as a single one of Ag, Al, Au, Cu, Cr, Sn, Fe, Mo, Pt, Ti, W, Zn or Zr. In one particular embodiment, the metal of the nano coating is selected from the group consisting of: Ni, Co, Al, Cu, Cr, Fe, Mo, Pt, Ti, W and Zr. In another embodiment, the metal of the nano coating is selected from the group consisting of: Co, Cu, Cr, Fe, Mo, Ni, W and Zr. It is to be understood that the term "pure" or "single metal" as used herein is intended to include a metal which may comprise trace elements of other components. As such, in a particular embodiment, the pure Nickel coating includes trace elements such as but not limited to: C=200 parts per million (ppm), S<500 ppm, Co=10 ppm, O=100 ppm.

The nanocrystalline metal coating applied to the fan blade 20 has a fine grain size, which provides improved structural properties of the blade. The nanocrystalline metal coating is a fine-grained metal, having an average grain size at least in the range of between 1 nm and 5000 nm. The nano coating tends to lower the stress and deflection in the substrate material when a load is applied. As the thickness of the coating increases, the stress and deflection of the substrate may be reduced. Conversely, the stiffness of the base metal material may have a significant impact on the overall deflection and stress levels in the nano coating. The designer may adjust (among other things) the relative thickness and strengths of these two components to provide the desired properties.

In a particular embodiment, the nanocrystalline metal coating has an average grain size of between about 10 nm and about 500 nm. More particularly, in another embodiment the nanocrystalline metal coating has an average grain size of between 10 nm and 50 nm, and more particularly still an average grain size of between 10 nm and 15 nm. The thickness of the nanocrystalline metal coating applied to the blade may range from about 0.0005 inch (0.0127 mm) to about 0.125 inch (3.175 mm) thick, however in a particular embodiment the nano-metal coating has a thickness of between 0.001 inch (0.0254 mm) and 0.008 inches (0.2032 mm). In another more particular embodiment, the nanocrystalline metal topcoat has a thickness of about 0.005 inches (0.127 mm). The thickness of the nanocrystalline metal coating may also be tuned (i.e. modified in specific regions thereof, as required) to provide a structurally optimum part. For example, the nanocrystalline metal topcoat may be formed thicker in expected weaker regions of the blade, such as the leading edge 38 thereof, and thinner in other regions, such as the central region of the airfoil 22. The thickness of the nanocrystalline metal coating therefore may not be uniform throughout the airfoil 22 or throughout the blade 20. For example, the nanocrystalline metal coating may have its greatest thickness at a LE of the airfoil, and taper in thickness along the surfaces of the airfoil extending away from the LE, thereby producing a tapered nanocrystalline metal coating. This tapered coating may extend either along only a portion of the airfoil surfaces or alternately along the full length of these surfaces such as to form a full, encapsulating, coating about the blade's airfoil 22.

Alternately, of course, this full encapsulating coating may also be provided with the coating having a uniform thickness (i.e. a full uniform coating) throughout. In the above-mentioned embodiment wherein the nanocrystalline metal coating is applied to only a portion of the airfoil, this part-coating can either have a substantially constant thickness or a varied (ex: tapered or otherwise non-constant) thickness within the coated portion of the fan blade.

The nanocrystalline metal coating may be composed of a pure metal such one selected from the group consisting of: Ag, Al, Au, Co, Cu, Cr, Sn, Fe, Mo, Ni, Pt, Ti, W, Zn and Zr, and is purposely pure (i.e. not alloyed with other elements) to obtain specific material properties sought herein.

The manipulation of the metal grain size, when processed according to the methods described below, produces the enhanced mechanical properties for the presently described gas turbine engine fan blade. In a particular embodiment, the pure metal of the nanocrystalline metal coating is nickel (Ni) or cobalt (Co), such as for example Nanovate™ nickel or cobalt (trademark of Integran Technologies Inc.) respectively, although other metals can alternately be used, such as for example copper (Cu) or one of the above-mentioned metals. The nanocrystalline metal coating applied to the fan blade is intended to be a pure nano-scale Ni, Co, Cu, etc. and is purposely not alloyed to obtain specific material properties.

In the above example, the nano coating is applied through a plating process in a bath, to deposit a nanocrystalline metallic coating to the fan blade 20, however any suitable plating or other coating process can be used, such as for instance the plating processes described in U.S. Pat. No. 5,352,266 issued Oct. 4, 1994; U.S. Pat. No. 5,433,797 issued Jul. 18, 1995; U.S. Pat. No. 7,425,255 issued Sep. 16, 2008; U.S. Pat. No. 7,387,578 issued Jun. 17, 2008; U.S. Pat. No. 7,354,354 issued Apr. 8, 2008; U.S. Pat. No. 7,591,745 issued Sep. 22, 2009; U.S. Pat. No. 7,387,587 B2 issued Jun. 17, 2008 and U.S. Pat. No. 7,320,832 issued Jan. 22, 2008, the entire contents of each of which are incorporated herein by reference. Any suitable number of plating layers (including one or multiple layers of different grain size, and/or a larger layer having graded average grain size and/or graded composition within the layer) may be provided. The nanocrystalline metal(s) material used is/are variously described in the patents incorporated by reference above, including in U.S. Pat. No. 5,352,266, U.S. Pat. No. 5,433,797, U.S. Pat. No. 7,425,255, U.S. Pat. No. 7,387,578, U.S. Pat. No. 7,354,354, U.S. Pat. No. 7,591,745, U.S. Pat. No. 7,387,587 and U.S. Pat. No. 7,320,832, the entire content of each of which is incorporated herein by reference.

In an alternate embodiment, the nanocrystalline metal coating layer may be applied to the substrate of the fan blade 20 using another suitable application process, such as by vapour deposition of the nanocrystalline metal coating, for example.

As mentioned, if required or desired, a non-conductive substrate surface such as fiber reinforced polymer composite can be rendered conductive, e.g. by coating the surface with a thin layer of silver, nickel, copper or by applying a conductive epoxy or polymeric adhesive materials prior to applying the coating layer(s).

Referring to FIG. 3, in another example, the fan blade 20 is fully coated or partially covered by a nano coating 40, as opposed to only being disposed on a LE region thereof. The entire blade (including, optionally, the platform 30 and blade root 32) made from titanium alloys, fibre reinforced polymer, aluminum alloys or the like, and can be coated all over. The presence of the nano coating may improve corrosion resistance, erosion resistance, prevent fretting and wear of blade root fixing, prevent blade tip wear from rubbing, improve thermal expansion match with the fan casing for improved blade tip clearance, or permit the base metal substrate to be made thinner (and thus lighter, and perhaps more aerodynamic) than would otherwise be possible for an uncoated fan blade because the nano coating may provide additional strength necessary to meet design requirements, e.g. bird ingestion etc. Doing so may yield an overall lighter blade and of thinner leading edge than use of the uncoated base substrate material alone. For example, the beak 30 and the leading edge 24 in prior art designs are often thicker than necessary for aerodynamic reasons, to ensure the beak and the leading edge has adequate FOD resistance. The present approach allows the beak 30 and the leading edge 24 to be strengthened without the need to appreciably increase the beak and the leading edge proportions or dimensions relative to an optimum aerodynamic design for the blade and beak.

In another example, the partially coated fan blade (not depicted) employs a base material which is not typically used in aircraft engine fan blades, such as aluminum alloy substrate, to provide fan blade 20 for improved FOD resistance and yet does not compromise the fan blade aerodynamic performance. In one example, the fan blade is completely encapsulated within the nano coating 40, as shown in FIG. 3. The composition and thickness, etc. of the nano coating 40 is selected to provide suitable enhancements in fan blade performance, such as in strength and stiffness, in fatigue endurance, in corrosion resistance, in erosion resistance, in thermal expansion match to fan casing, in aerodynamic performance, in dynamic performance, in airfoil dynamic tuning, in FOD resistance and in wear resistance, etc.

In another example, the fully coated fan blade 20 of FIG. 3 employs a base material which is not typically used in aircraft engine fan blades, such as carbon fibre reinforced polymer or carbon fibre composite fan blade substrate.

Bonded metal sheaths that are typically used for FOD protection compromise blade aerodynamic performance. The blade can also be made of a polymer or metal, which is subsequently fully coated (including, optionally, the platform 34 and blade root 32), to provide fan blade 20 for improved FOD resistance without compromising fan blade aerodynamic performance. In a particular embodiment, the polymer substrate may be a thermoset type polymer such as, but not limited to, epoxy or a thermoplastic type polymer such as, but not limited to, polyamide, PEEK or the like. In another embodiment, the reinforcement fiber may be high modulus carbon fiber, medium modulus carbon fiber, low modulus carbon fiber, E glass fiber, S glass fiber, polymer fiber, or natural fiber. In one example, the fan blade is completely encapsulated within the nano coating 40. The use of fiber reinforced polymers may, for example, permit the use of near net shape manufacturing methods, such as automated 3D braiding and/or automated 3D weaving, which may beneficially reduce costs. The composition and thickness, etc. of the nano coating 40 is selected to provide suitable enhancements in fan blade performance, such as in strength and stiffness, in fatigue endurance, in corrosion resistance, in erosion resistance, in thermal expansion match to fan casing, in aerodynamic performance, in dynamic performance, in airfoil dynamic tuning, in FOD resistance and in wear resistance, etc. Alternately short fiber reinforced polymer composite materials can be injection moulded and then nano coated to form the blade.

Figure 7:
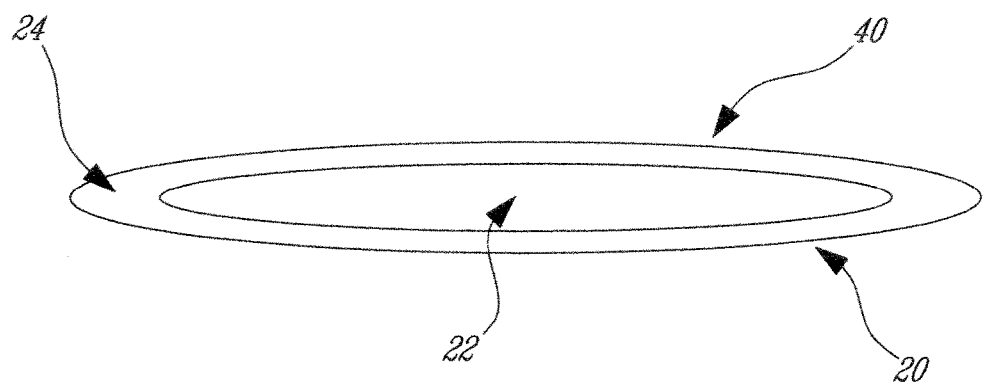
FIG. 7 is a schematic cross-sectional view of the blade of FIG. 3.
Figure 8:
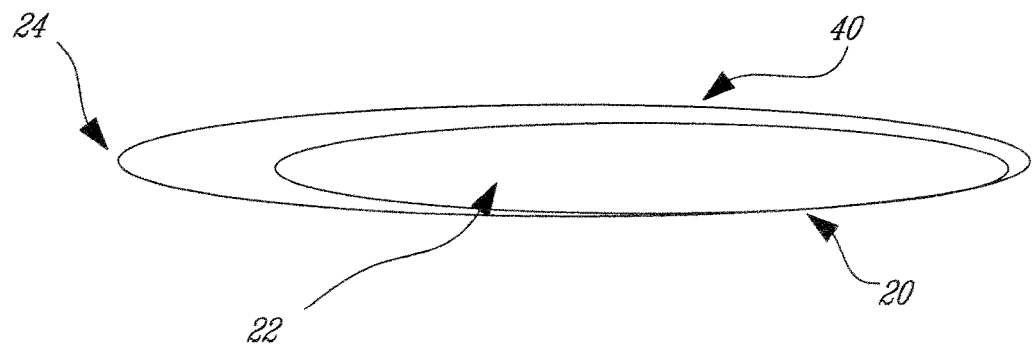
FIG. 8 is a schematic cross-sectional view of a blade with blended edges.

In another example, the coating thickness of the fan blade 20 of FIG. 3 may vary as a function of position on the blade, to minimize weight, locally increase strength, stiffness or resistance, etc. FIG. 7 shows a cross-sectional view of the fan blade of FIG. 3, with a variable thickness nanocrystalline coating on the substrate material of the airfoil 22. More particularly, in FIG. 7 it can be seen that the nanocrystalline coating 40 is thicker at the leading edge 24 and the trailing edge, than along the body of the blade's airfoil 22. Referring to FIG. 8, in another example the variable thickness of the nanocrystalline coating 40 may be any suitable thickness, including "0" as in the example depicted, on certain portion(s) of the blade, which may allow the designer the control structural properties of the blade at specific points along the blade. These structural properties include stiffness/vibration, hardness, erosion, flexibility, damping, toughness and others.

Referring to FIG. 4, in another example, an integrally-bladed fan (IBF) 12' is provided, having airfoil portions 20'. The IBF 12' is similar to the fan 12 described above, however the individual blades 20' of the IBF 12' are integrally formed with the hub of the fan, rather than having separate blades which removably mount to a central hub. The base metal or substrate material of the IBF 12' may be provided from among the options described above. Depending on the base material selection, the blade airfoil portions 20' may have a nano coated leading edge 38' or be entirely or partially covered with a nano coating 40'.

Figure 5:
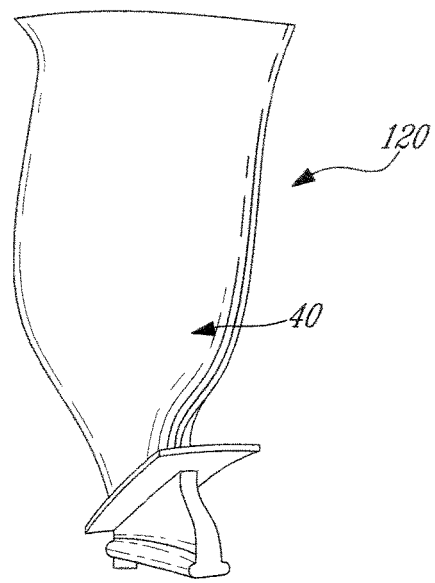
FIG. 5 is a view similar to FIG. 3, showing another example of a fan blade for use in the engine of FIG. 1.

Referring to FIG. 5, in another example, the fan blade 120 substrate material is a nano foam material, which is either machined from a block or may be injection moulded or made from any other suitable process. The foam may be an open-cell or closed-cell foam and may be provided in a form (e.g. 1 lb/ft3) which provides a sufficient substrate material to be fully coated with a nano coating 40, in a similar manner as described above. The nano foam may be provided in accordance with the instructions found in U.S. Pat. No. 7,771,289 B2 and/or US 2009/0159451 A1, incorporated herein fully by reference.

The fan blade 120 substrate material may be either metal foam or a nano metal foam material. Polymer or metal foam materials exist which contain controlled open cell structure of low density (e.g. 1 lb/ft3). These foams are commercially available and are manufactured using a variety of techniques. A nano foam is a composite material that contains the polymer foam which has subsequently been coated with nano metal. This nano foam can be shaped using typical manufacturing processes such as electro chemical machining (ECM), laser trimming and electro discharge machining (EDM). This shaped metal foam or alternately nano foam can then be covered by a bonded polymer sheet which is subsequently nano coated. Alternatively, the shaped metal foam or nano foam can be placed in a mould and filled with a polymer or wax material. The filled shape can then be subsequently nano coated to form the airfoil outer surface. The filler material can be left or removed after the final nano coat has been applied. Alternately, stereo lithography, three-dimensional printing, laser metal deposition or other suitable rapid prototyping/rapid manufacturing technology may be used to produce a foam cored structure blade pre-form and then nano coated to form a foam cored nano metal fan blade. For blade pre-form made of polymer type material, it is left behind after nano coat for vibration damping purpose. An example metal foam is found in U.S. Pat. No. 5,584,983, the contents of which are fully incorporated herein by reference.

Figure 6:
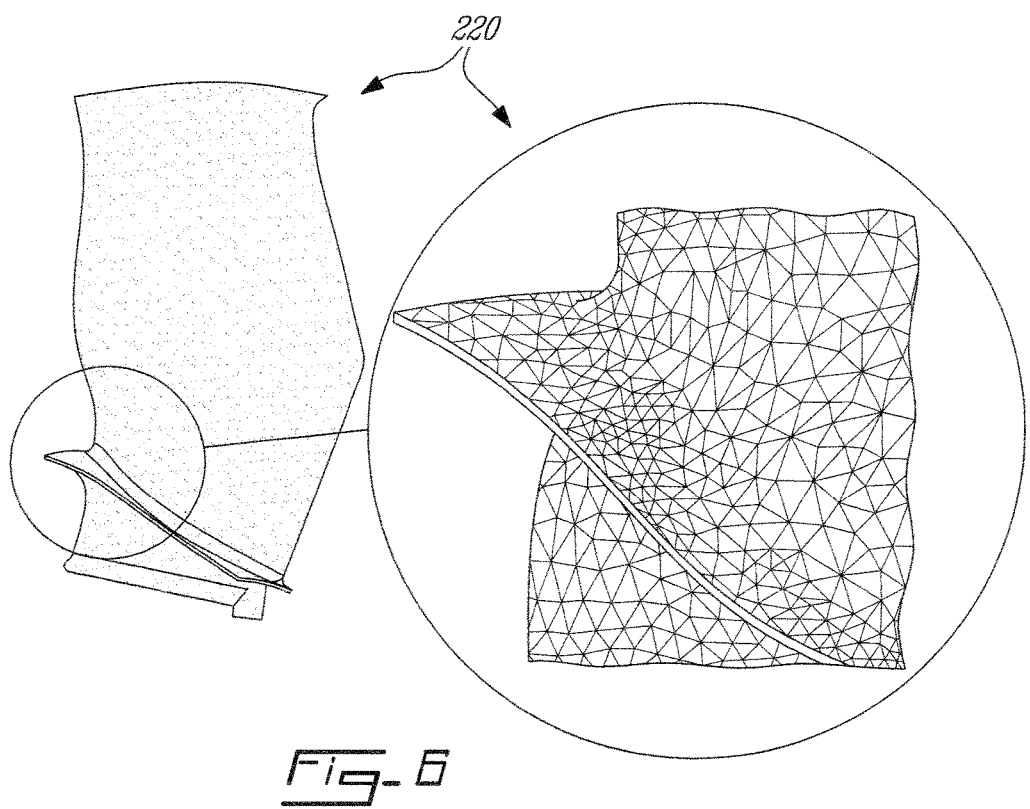
FIG. 6 is an isometric view, with enlarged inset, of another example of a fan blade of the engine of FIG. 1.

Referring to FIG. 6, in another example, the substrate material of the fan blade 220 is a nano-truss material. The nano truss can be organised in any suitable form, such as triangular or polygon shapes, to form a regular truss structure. The nano truss structure is typically lower density and highly organised relative to a nano foam. Polymer truss materials exist which contain controlled porous material which is open cell of low density. These trusses are commercially available and are manufactured using a variety of techniques. A nano truss is a composite material that contains the polymer truss which has subsequently been coated with nano metal. This nano truss can be shaped using typical manufacturing processes such as machining, laser trimming and EDM. This shaped nano truss can then be covered by a bonded polymer sheet which is subsequently nano coated. Alternatively, the shaped nano truss can be placed in a mould and filled with a polymer or wax material or any suitable fill material. The filled shape can then be subsequently nano coated to form the airfoil outer surface. The filler material can be left or removed after the final nano coat has been applied. Alternately, stereo lithography, three-dimensional printing, laser metal deposition or other suitable rapid prototyping/rapid manufacturing technology may be used to produce a truss core/space frame structured cored blade pre-form and then nano coated to form a truss/space frame cored nano metal fan blade. For blade pre-form made of polymer type material, it is left behind after nano coat for vibration damping purpose. See above for other fabrication details.

Referring again to FIG. 5, in another example the fan blade 120 may be manufactured by producing a wax pre-form (or other suitable material, e.g. polymer) by moulding methods, e.g. compression, injection etc. Alternately, the blade can be made hollow and comprising two sections which are formed by injection molding a substrate material, then joining the two surface sections and nano coating the complete structure. This would create a hollow blade which can have structural elements for support.

Optionally, for a sacrificial type of blade pre-form (e.g. wax, low melting point polymer, etc.) intended to be removed to make hollow fan blades, once the nano coating is deposited to the substrate of the formed blade to create a coated blade, heating the coated blade will melt out the wax or polymer pre-form (or other suitable material which can melt), and thereby leave a hollow cavity in the blade. It will be understood that other means for evacuating the wax material from the hollow blade may be provided, as desired, depending on the design constraints, etc.

The nano coating 40 may be applied regardless of complexity of airfoil shape, and also allows the leading edge 24 to be very sharp, e.g. 0.001 inch thick, such as to minimize the boundary layer effect and as such may improve performance. It is to be understood that the leading edge coating 38 and the coating 40 may be provided as at least a single layer, or layers with different grain size, and/or a larger layer having graded average grain size and/or graded composition within the layer, or of multiple layers top coated to the substrate material.

In another aspect of this embodiment, the molecules comprising the surface of the coating 40 may be manipulated on a nanocrystalline scale to affect the topography of the final surface to improve the hydrophobicity (i.e. ability of the surface to repel water) to thereby provide the blade airfoil surface which may beneficially reduce the amount of water and/or ice build up on the airfoil surfaces which otherwise degrades the aerodynamic performance of the blade. Furthermore the reduced ice build up reduces severity of ice shedding which avoids FOD of downstream components which will maintain engine durability and performance.

The above coating processes can be applied to new blades during an original production process, or as a repair to blades which have already been used in service. Existing damaged blade surfaces can be nano coated to restore original dimensions.

Using the nanocrystalline metal coated fan blade and method of producing same as described above, an integrated blade assembly, or integrated bladed rotor (IBR), can be provided which is coated in part or fully encapsulated by such a nanocrystalline metal. Additionally, intricate shapes can now be manufactured, for example blades having smaller LE geometries, which can still be strengthened by applying the presently described nanocrystalline coating, which was previously couldn't be accomplished with previous designs. Additionally, using the presently described method, fan blades can be manufactured using nano trusses and/or metal nano foams, such as that described above, which are at least partially coated, and possibly fully encapsulated, by the presently described nanocrystalline metal coating.

A blade according to the present teachings may also be employed in other suitable applications, including but not limited to, air handling systems such as industrial or other cooling fans, and prime movers such as marine and aircraft propellers. The blades according to the present teaching may also be used in industrial gas turbine engines, auxiliary power units (APUs), industrial cooling fan systems and the like.

The above description is meant to be exemplary only, and one skilled in the art will recognize that changes may be made to the embodiments described without departing from the scope of the invention disclosed. Any suitable base metals, polymers or other materials may be used as the substrate material, and any suitable metal and/or metal combinations may be selected for the coating. Any suitable manner of applying the coating layer may be employed. Still other modifications which fall within the scope of the present invention will be apparent to those skilled in the art, in light of a review of this disclosure, and such modifications are intended to fall within the appended claims.

The invention claimed is:

1. A method of manufacturing a fan blade for a gas turbine engine comprising the steps of: providing a sacrificial fan blade core having an airfoil having a leading edge and a trailing edge, the airfoil extending from a root to a tip, the sacrificial fan blade core selected from the group consisting of composites and polymers; applying a nanocrystalline metal coating over an entirety of the sacrificial fan blade core, the nanocrystalline metal of the nanocrystalline metal coating having an average grain size of between 10 nm and 500 nm, the nanocrystalline metal coating forming a structural element of the fan blade; and removing the sacrificial fan blade core after applying the nanocrystalline metal coating.

2. The method as defined in claim 1, wherein the sacrificial fan blade core is provided using at least one of stereo lithography, three-dimensional printing and laser metal deposition.

3. The method as defined in claim 1, wherein applying the nanocrystalline metal coating includes applying the nanocrystalline metal coating with one or more regions having a reduced coating thickness and one or more regions having an increased coating thickness, the location on said airfoil of said regions of reduced and increased coating thickness being selected to at least one of reduce stresses in the fan blade, increase stiffness of the fan blade to reduce deflections thereof, and dynamically tune the fan blade.

4. The method as defined in claim 1, further comprising providing the nanocrystalline metal coating with a hydrophobic-causing topography on an outer surface thereof to prevent water and/or ice from sticking to the fan blade.

5. The method as defined in claim 1, further comprising applying an intermediate bond coat to at least a portion of the fan blade core, prior to applying the nanocrystalline metal coating.

6. The method as defined in claim 1, wherein applying the nanocrystalline metal coating includes applying the nanocrystalline metal coating in a single layer.

7. The method as defined in claim 1, wherein applying the nanocrystalline metal coating includes applying the nanocrystalline metal coating as a pure metal.

8. The method as defined in claim 7, wherein the pure metal is selected from the group consisting of: Ni, Co, Ag, Al, Au, Cu, Cr, Sn, Fe, Mo, Pt, Ti, W, Zn, and Zr.

* * * * *